United States Patent

Louton, Jr.

[15] 3,649,067
[45] Mar. 14, 1972

[54] CLOSURE MOUNTING MEANS

[72] Inventor: James C. Louton, Jr., Bloomfield Hills, Mich.

[73] Assignee: General Motors Corporation, Detroit, Mich.

[22] Filed: Sept. 16, 1970

[21] Appl. No.: 72,750

[52] U.S. Cl. .....................................296/50, 49/41, 49/372
[51] Int. Cl. ..........................................................B60j 5/10
[58] Field of Search ...................296/50, 57 R, 57 A; 49/40, 49/41, 360, 372, 381

[56] References Cited

UNITED STATES PATENTS

| | | | |
|---|---|---|---|
| 3,336,070 | 8/1967 | Jackson | 296/57 R |
| 3,567,209 | 3/1971 | Lathers | 296/50 |

Primary Examiner—Benjamin Hersh
Assistant Examiner—Leslie J. Paperner
Attorney—W. E. Finken and D. L. Ellis

[57] ABSTRACT

A closure is supported on a vehicle body asymmetrically with respect to the center of gravity of the closure for bodily shiftable movement in a path between open and closed positions relative to an opening in the vehicle body and movement synchronizing means indirectly rigidify the support means by maintaining the closure in a predetermined attitude, the movement synchronizing means including a planar rigid frame, a pair of idler arms each pivotally supported on the vehicle body and pivotally attached to the rigid frame at opposite ends of one edge thereof, and means pivotally connecting a parallel edge of the rigid frame to the closure adjacent an edge of the latter parallel to the aforementioned edge of the rigid frame.

5 Claims, 5 Drawing Figures

INVENTOR.
James C. Louton, Jr.
BY
D. L. Ellis
ATTORNEY

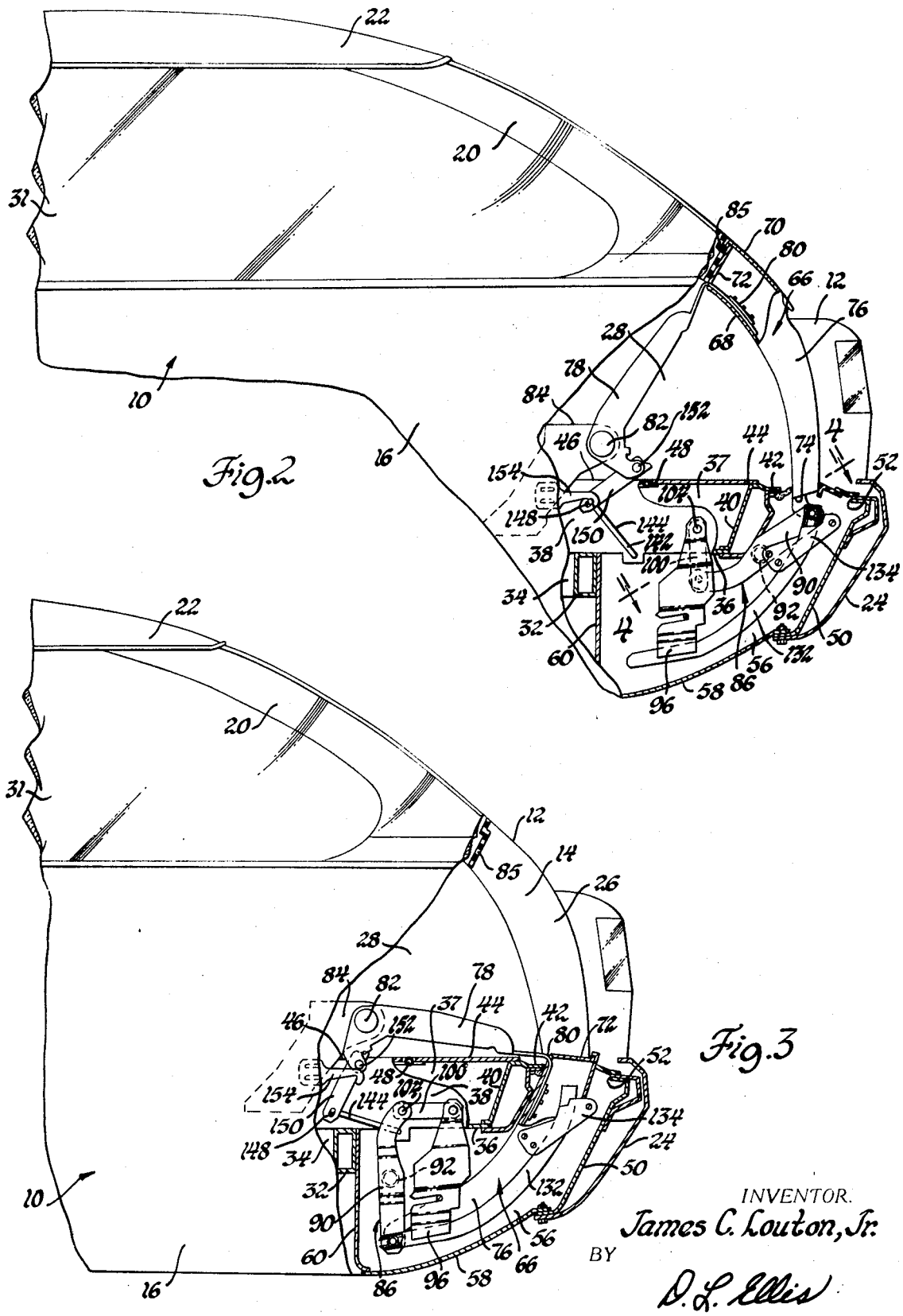

Patented March 14, 1972

INVENTOR.
James C. Louton, Jr.
BY
D. L. Ellis
ATTORNEY

CLOSURE MOUNTING MEANS

This invention relates generally to vehicle body closures and more particularly to a closure for the rear opening in a station wagon type vehicle body.

A station wagon type vehicle on which a tailgate is supported for generally vertical bodily shiftable movement relative to the rear opening in the vehicle body is preferable to a vehicle on which the tailgate is supported for conventional swinging movement because the vehicle with the vertically moving tailgate can be positioned closer to loading platforms and the like to facilitate transfer of cargo to or from the vehicle through the rear opening. Design limitations, however, render difficult the task of reducing to practice a tailgate support arrangement which provides the required vertical movement and which is dependable, easily operable, economical to manufacture, and so compact as not to interfere with normal operation of the vehicle. In particular, the common station wagon design practice of storing the spare tire in a vertical orientation at one side of the vehicle body cargo compartment adjacent the rear opening dictates that this area be kept free of tailgate support linkage when the rear opening is open. In the closure installation disclosed in the copending application of Bert R. Wanlass, Ser. No. 72,685 and assigned to the assignee of this invention, the tailgate is supported asymmetrically with respect to its center of gravity by a single control arm attached to the closure adjacent one edge. Such an arrangement leaves one side of the vehicle body free of support linkage but subjects the control arm to a severe bending moment about its attachment to the tailgate. In the aforementioned application of Bert R. Wanlass, movement synchronizing means are disclosed which function to indirectly rigidify the control arm by equalizing incremental movement of opposite sides of the tailgate. Closure mounting means according to this invention incorporate movement synchronizing means which represent an improvement over the aforementioned movement synchronizing means.

The primary feature of this invention is that it provides improved closure mounting means for a closure adapted to close an opening in a vehicle body, the closure mounting means including a control arm pivotally supported on the vehicle body and attached to the closure asymmetrically with respect to the center of gravity of the latter and movement synchronizing means indirectly rigidifying the control arm, the movement synchronizing means including rigid frame means and means connecting the rigid frame means to the closure and to the vehicle body such that the frame means and the connecting means maintain the closure in a predetermined attitude. Other features of this invention reside, first, in the provision of rigid frame means defining a plane having first and second parallel edges and, second, in the provision of connecting means pivotally connecting the first edge of the rigid frame means to the closure and pivotally supporting the second edge on the vehicle body in parallel relation to a fixed axis of the vehicle body, the closure applying an asymmetric force on the rigid frame means urging the second edge of the latter out of parallel relation to the fixed axis and the connecting means rigidly resisting the asymmetric force to thereby maintain the closure in the predetermined attitude. Yet another feature of this invention resides in the provision of connecting means including a pair of idler arms each supported on the vehicle body in parallel and spaced relation and for pivotal movement about the fixed axis of the latter, each idler arm being pivotally connected to the rigid frame means adjacent the second edge of the latter and always oriented generally parallel to the instantaneous direction of movement of the first edge to thereby rigidly resist movement of the second edge in that direction. A still further feature of this invention resides in the provision of auxiliary guide means and cooperating follower means operable to stabilize the closure panel in a direction generally perpendicular to the plane thereof.

These and other features of this invention will be readily apparent from the following specification and from the drawings wherein:

FIG. 2 is a fragmentary partially broken away side elevational view of a station wagon type vehicle body incorporating closure mounting means according to this invention and showing the closure in a raised or closed position;

FIG. 3 is similar to FIG. 2 and showing the closure in a lowered or open position;

Figure 1:
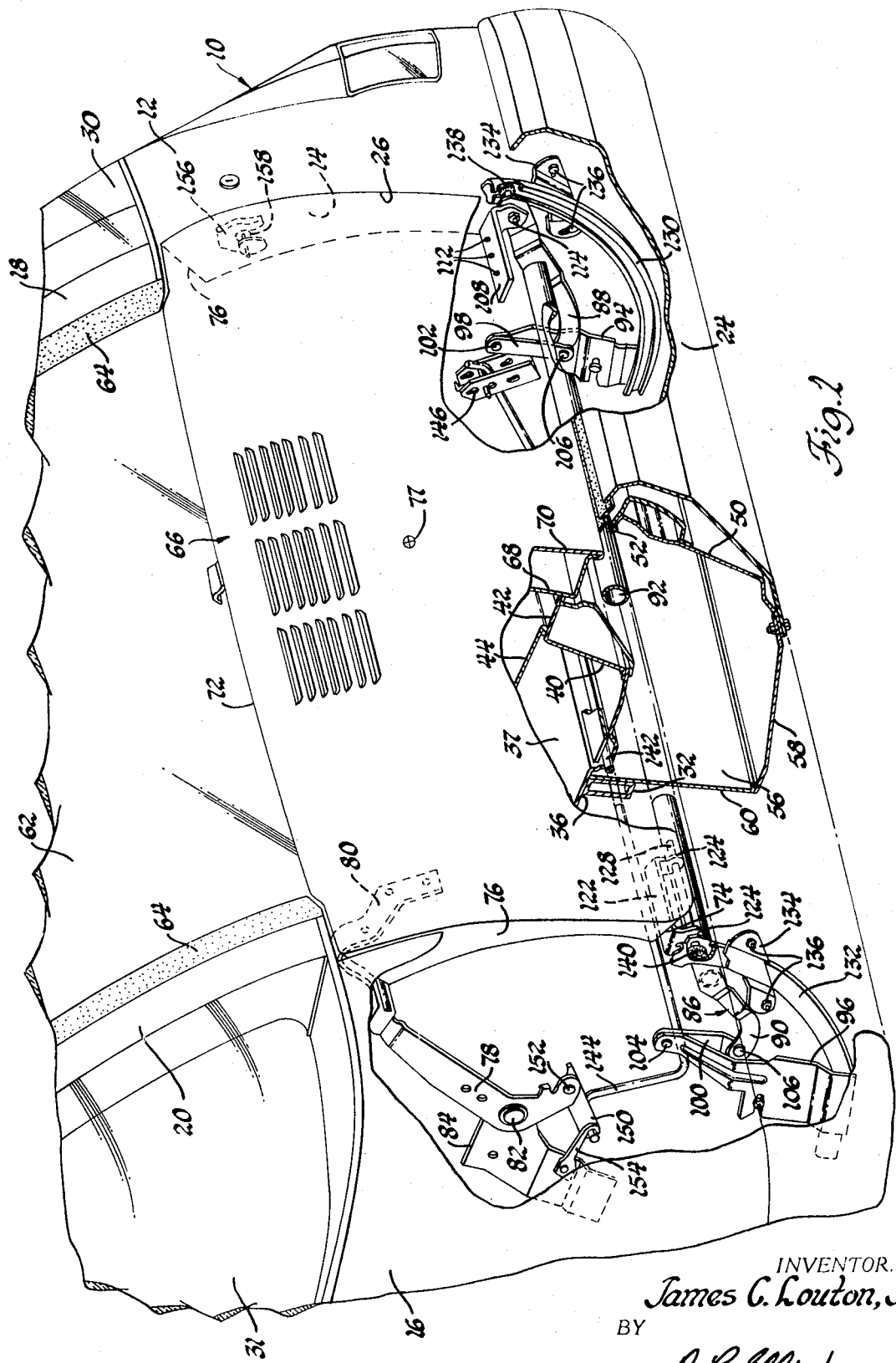
FIG. 1 is a fragmentary partially broken away perspective view of the rear portion of a station wagon type vehicle body incorporating closure mounting means according to this invention.

Referring now to FIGS. 1, 2 and 3 of the drawings, a station wagon type automobile vehicle body designated generally 10 includes a right quarter panel structure 12 defining a jamb 14 and a left quarter panel structure 16 defining a similar jamb, not shown, facing jamb 14. A right body pillar 18 and a left body pillar 20 extend forwardly and upwardly in parallel relation from respective ones of the right and left quarter panel structures to a roof structure 22 of the vehicle body. A bumper member 24 extends transversely of the vehicle body between the quarter panel structures and cooperates with the jambs on the latter, the body pillars and the roof structure in defining a generally rectangular rear opening 26 through which access may be had to a cargo compartment 28 of the vehicle body, FIGS. 2 and 3. A pair of side window panels 30 and 31 are sealingly received within respective ones of a pair of side window openings in the vehicle body between the roof structure and the quarter panel structures, each window panel curving around the rear of the vehicle body and into sealing engagement with a corresponding one of the left and right body pillars 18 and 20, FIG. 1.

As best seen in FIGS. 1, 2 and 3, the chassis frame supporting the vehicle body 10 is generally conventional and includes a pair of laterally spaced frame rails interconnected adjacent their rearward ends by a lower cross member 32, only left frame rail member 34 being shown in FIGS. 2 and 3. A pair of side panel structures extend upwardly from respective ones of the frame rails and cooperate with a lower floor pan 36 in defining a storage space 37 in the vehicle body 10, only left side panel structure 38 being shown in FIGS. 2 and 3. A brace 40 is welded to the rear edge portion of the lower floor pan 36 and cooperates therewith to provide an upper cross member 42. The storage area 37 is opened and closed in a conventional manner by a load floor segment 44 pivotally attached to a fixed load supporting floor 46 by a hinge 48. The free edge of the load floor segment 44, in a closed position thereof, rests generally on the upper cross member 42 to provide a horizontal continuation of the load supporting floor 46 generally at the level of the top of the bumper member 24.

Referring again to FIGS. 1, 2 and 3, a rear sill panel 50 extends transversely between the quarter panel structures and is longitudinally spaced rearwardly from the upper cross member 42, the sill panel cooperating with the upper cross member and the jambs of the quarter panel structures 12 and 16 in defining a generally horizontal rectangular opening 52. The sill panel is protected against impacts from rearwardly of the vehicle by the bumper member 24 which is rigidly secured to the frame rails 34 by conventional means, not shown. As best seen in FIGS. 2 and 3, the rectangular opening 52 is situated generally at the top of a storage well 56, the storage well being located between the quarter panel structures and bounded by the lower floor pan 36, the sill panel 50, a filler plate 58 welded to the sill panel and bolted to the bumper member, and by an end wall 60 welded to the filler plate 58 and to the lower cross member 32.

The upper portion of the rear opening 26 is adapted to be closed by a sliding window panel arrangement, a full and complete description of which appears in the copending application of Charles A. Stebbins, Ser. No. 72,685 for reference purposes and assigned to the assignee of this invention. As best seen in FIG. 1, the window panel arrangement generally includes a window panel 62 having four roller followers, not shown, rotatably supported at each corner thereof, the roller followers on the right and left vertical sides of the window panel engaging respective ones of a pair of cam channels, not shown, rigidly secured to the vehicle body within corresponding ones of the body pillars. Thus mounted, the window panel 62 spans the distance between the body pillars 18 and 20 and is guided by the cam channels for bodily shiftable movement between a closed or lowered position, FIG. 1, closing the upper portion of the rear opening and in sealing engagement with a pair of rubber seals 64 on respective ones of the body pillars and a raised or open position, not shown, located within the vehicle roof structure 22 remote from the rear opening. Electrically powered drive means, not shown, on the vehicle body function in a conventional manner to selectively move the window panel between the raised and the lowered positions in response to a signal from an operator. The lower portion of the rear opening 26 is adapted to be closed by a closure or tailgate 66 supported on the vehicle body by closure mounting means according to this invention.

Referring to FIG. 1, the tailgate 66 is a generally hollow shell fabricated from an inner panel 68 and an outer panel 70 hem flanged together around the perimeter of the latter, the inner panel defining an upper marginal edge 72, a lower marginal edge 74 and a pair of vertical sides 76 of the tailgate. The tailgate 66 is generally symmetrical about a vertical centerline so that the center of gravity 77 of the tailgate is situated generally at the center thereof.

As best seen in FIGS. 1 and 2, a generally L-shaped control arm 78 having a flat in-turned mounting flange 80 thereon is pivotally mounted at 82 on a support plate 84 adjustably fastened to the left quarter panel structure 16. The flange 80 protrudes through an aperture in the tailgate inner panel and is rigidly fastened to the inner surface of the latter generally adjacent the left end of upper marginal edge 72. The control arm 78 thus supports the tailgate on the vehicle body for generally vertical bodily shiftable movement between a raised or closed position, FIGS. 1 and 2, wherein the tailgate closes the lower portion of the rear opening 26 with opposite ends of the upper marginal edge 72 thereof in sealing engagement with respective ones of a pair of rubber seals 85 on the lower ends of corresponding ones of the body pillars 18 and 20, and a lowered or open position FIG. 3, located within the storage well 56 remote from the rear opening 26.

As seen best in FIG. 1, the control arm 78 supports the tailgate asymmetrically with respect to the center of gravity 77 of the latter so that the right side of the rear opening 26 is unencumbered by linkage which might obstruct access to the spare tire, not shown. As a result, however, the control arm 78 is subjected to a severe turning moment applied thereto by the tailgate at the mounting flange 80 and in the plane of the tailgate. Unless rigidified, the control arm could be twisted under the weight of the tailgate and the latter tilted in the plane thereof and possibly wedged between the jambs on the quarter panel structure.

Figure 4:
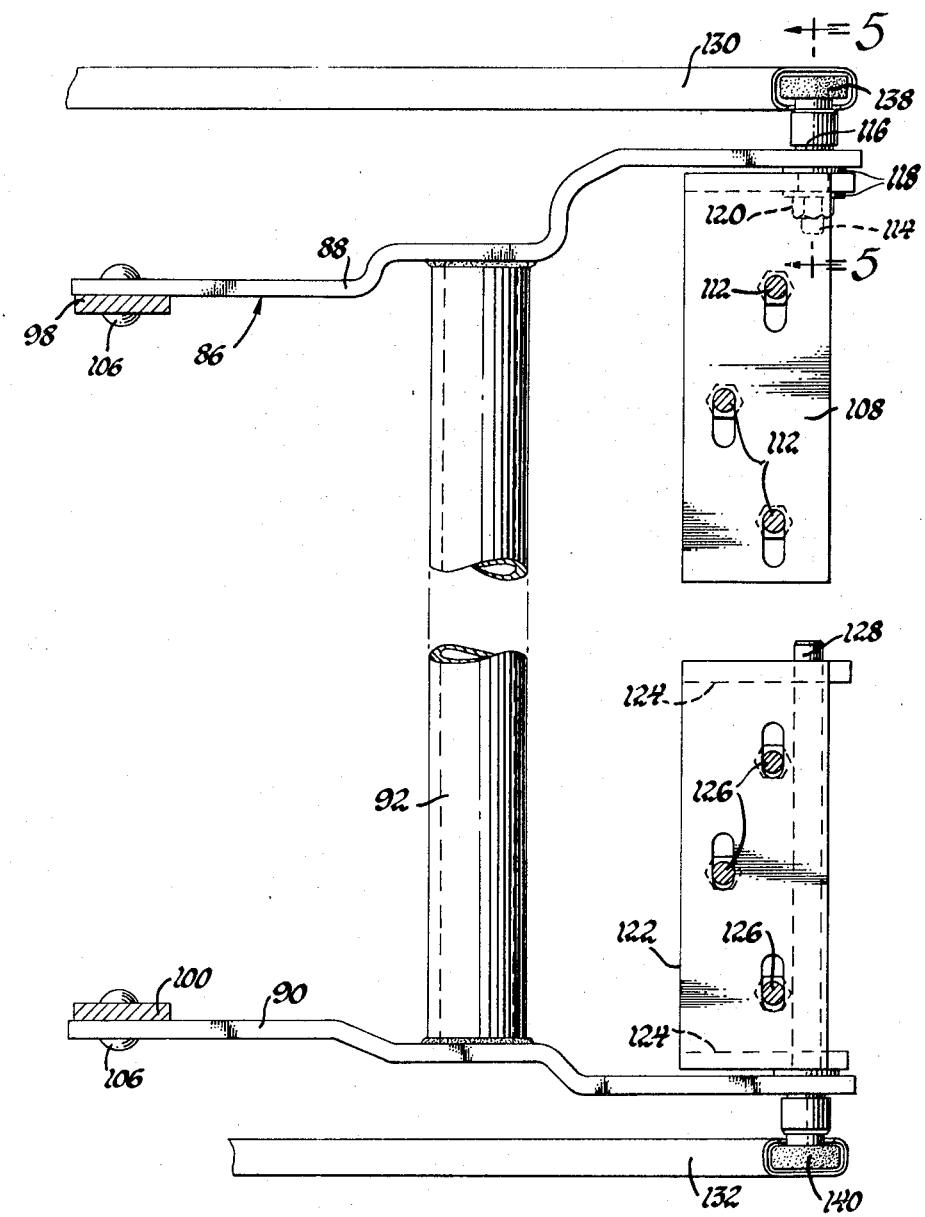
FIG. 4 is an enlarged sectional view taken generally along the plane indicated by lines 4—4 in FIG. 2.

As seen best in FIG. 1, movement synchronizing means are provided to indirectly rigidify the control arm 78 and include, first, a rigid frame means 86. Referring now to FIG. 4, the frame means 86 includes a first support member 88 and a second support member 90. The first and second support members are rigidly interconnected in parallel relation by a torque resisting member or tube 92 welded at each end to a respective one of the support members. The frame means 86 thus defines a very rigid and generally flat and rectangular plane having an imaginary first or outboard edge parallel to an imaginary second or inboard edge, the edges to extend transversely of the vehicle body.

As best seen in FIGS. 1 and 4, the movement synchronizing means further includes connecting means for supporting the frame means 86 between the tailgate and the vehicle body. The connecting means includes, first, a pair of support plates 94 and 96 rigidly affixed to respective ones of the quarter panel structures. The mounting means further includes a pair of idler arms 98 and 100 supported, respectively, at 102 and 104 on plates 94 and 96 for pivotal movement about a fixed transverse axis of the vehicle body passing through pivots 102 and 104. Each idler arm carries a rivet 106 at the distal end thereof which rivets are axially aligned when the idler arms are parallel.

Referring now to FIG. 4, rivet 106 on idler arm 98 rotatably supports one end of support member 88. Similarly, rivet 106 on idler arm 100 rotatably supports one end of support member 90. The frame means 86, being flat and very rigid, maintains the idler arms 98 and 100 in parallel relation and the rivets function to support the frame means on the idler arms adjacent the second or inboard edge of the former for pivotal movement about the axis defined by the rivets.

Figure 5:
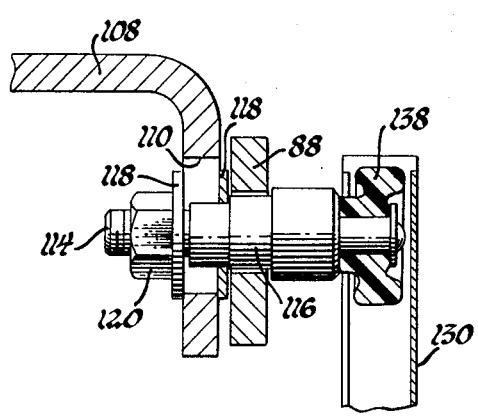
FIG. 5 is a sectional view taken generally along the plane indicated by lines 5—5 in FIG. 4.

As best seen in FIGS. 1, 4 and 5, the connecting means further includes a first bracket member 108 having a slot 110 therein, the bracket member 108 being rigidly affixed, as by bolt 112, to the lower marginal edge 74 of the tailgate generally at the right end thereof. A first shaft 114, FIG. 5, having a bearing surface 116 thereon is attached to the first bracket member 108 by means of a pair of washers 118 and a nut 120 threaded on one end of the shaft. Loosening of the nut 120 permits adjustment of the shaft 114 relative to the first bracket member 108 and the tailgate.

As best seen in FIGS. 1 and 4, a second bracket member 122 having a pair of integral depending flanges 124 is rigidly affixed, as by bolts 126, to the lower marginal edge 74 of the tailgate generally at the left end thereof. A second shaft 128 is received within respective ones of a pair of aligned apertures in corresponding ones of the depending flanges 124, the flanges thereby supporting the second shaft 128 for rotary movement and bodily shiftable movement longitudinally thereof relative to the second bracket member 122.

Referring to FIGS. 1, 4 and 5, the distal end of support member 88 is rotatably journaled on the bearing surface 116 of the first shaft 114 rigidly affixed to bracket member 108. Similarly, the distal end of support member 90 is rotatably journaled on the shank of the second shaft 128. The frame means 86 is thus pivotally attached adjacent the first or outboard edge thereof to the tailgate adjacent opposite ends of the lower marginal edge 74 of the latter, the second or inboard edge being supported on the vehicle body by the idler arms 98 and 100 through the support plates 94 and 96.

A further complication introduced by utilizing only a single control arm is that the stability of the tailgate longitudinally of the vehicle body is decreased. More particularly, with the control arm 78 being rigidly affixed to the tailgate generally at the upper marginal edge 72, the tailgate itself functions as a long lever arm relative to the bend in the control arm adjacent the mounting flange 80. A force applied to the tailgate near the lower marginal edge 74 and directed longitudinally of the vehicle body is multiplied by the lever arm and might well cause bending of the arm. Such forces need not be large and could be generated merely by normal vibrations set up during movement of the vehicle.

As best seen in FIGS. 1, 4 and 5, means are provided to stabilize the lower marginal edge of the tailgate and include a pair of auxiliary cam channel guides 130 and 132 the lower ends of which are rigidly attached, as by welding, to respective ones of the support plates 94 and 96. The upper end of each cam channel has affixed thereto, as by welding, a secondary support plate 134 and each secondary support plate is rigidly secured to a corresponding one of the quarter panel structures 12 and 16 by bolts 136, FIG. 1. The cam channels 130 and 132 are thus rigidly attached to the vehicle body in parallel relation and on opposite sides of the storage well 56.

Cooperating with the guides are follower means including a first roller 138 rotatably supported on the end of first shaft 114, FIGS. 4 and 5, and guidingly captured in cam channel 130. Similarly, a second roller 140 is rotatably supported on the end of the second shaft 128 and is guidingly captured in the cam channel 132, FIG. 4. The rollers and cam channels cooperate in a conventional manner to prevent undesirable fore and aft or longitudinal movement of the lower edge of the tailgate relative to the vehicle body. The second shaft 128 is unrestrained longitudinally of the tailgate so that as the latter is bodily shifted between the open and closed positions any deviations in parallelism between the cam channels 130 and 132 will not result in jamming the rollers against the sides of the channels. Ideally, the curvature of the cam channels should define a true arc about a transverse axis of the vehicle body through pivot 82 since the upper marginal edge of the tailgate traverses such an arc. It has, however, been found that the curvature may deviate somewhat from the true arc in order to achieve satisfactory sealing between the vertical sides of the tailgate and vertical seal members, not shown, on the vehicle body, the deviations causing only slight and insignificant bending of the control arm and the tailgate.

Referring now to FIGS. 1, 2 and 3, counterbalance means are provided to facilitate operation of the tailgate, the counterbalance means being described in detail in the aforementioned copending application of Bert R. Wanlass. Basically, the counterbalance means includes a torsion rod 142 having a crank 144 formed at one end thereof. The end of the torsion rod opposite the crank 144 is adjustably captured in a retainer 146 rigidly secured to the vehicle body, the retainer preventing rotation of the right end, FIG. 1, of the torsion rod. The crank 144 of the torsion rod is received within a slot 148 situated generally at one end of an intermediate link 150, the other end of the intermediate link being pivotally attached to the short leg portion of the L-shaped control arm 78 at 152. The torsion rod is preloaded in a conventional manner to urge the crank 144 in a clockwise direction, FIGS. 2 and 3, and a hook 154 rigidly affixed to the support bracket 84 is situated in the arcuate path of the crank to capture the latter when it achieves a predetermined angular position.

Generally, the torsion rod 142 exerts a force on the intermediate link 150 which force is directed longitudinally along the intermediate link and generates on the control arm a counterclockwise force couple, FIGS. 2 and 3, about pivot 82. The magnitude of the force couple depends on the lever arm or perpendicular distance between the longitudinal axis of the intermediate link and the pivot 82. The relative positions of the pivot 82 and the torsion rod dictate that as the tailgate is moved from the closed position, FIGS. 1 and 2, to the open position, FIG. 3, the longitudinal axis of the intermediate link approaches intersection with the pivot 82. Thus, even though the force exerted by the torsion rod is maximum when the tailgate is in the open position, the force couple about pivot 82 is of minimum magnitude and insufficient to overcome the force couple generated on the control arm about pivot 82 by the weight of the tailgate which therefore remains in the open position without auxiliary latching devices. The hook 154 limits torsion rod motivated upward movement of the tailgate to a released position, not shown, somewhat below the closed position and the slot 148 permits lost motion between the intermediate link 150 and the crank 144 so that the tailgate can be manually lifted from the released to the closed position.

Referring now to FIG. 1 of the drawings, in the raised position of the tailgate a latch assembly 156 mounted on jamb 14 on the right quarter panel structure 12 engages a striker 158 rigidly affixed to the right vertical side 76 of the tailgate to hold the right side 76 in a position corresponding to the closed position of the tailgate. For a full and detailed description of the latch assembly 156 and the striker 158, reference may be made to the copending application of Bert R. Wanlass and Alfonsas Velavicius, Ser. No. 72,735 and assigned to the assignee of this invention. With the right vertical side thus restrained, the first shaft 114 is restrained against vertical movement relative to the vehicle body by first bracket member 108 and is restrained against longitudinal movement relative to the vehicle body by cam channel 130. The length of support member 88 is predetermined to always position the idler arm 98 parallel to the instantaneous direction of movement of roller 138 and, hence, the instantaneous direction of movement of the first or outboard edge of the frame means, such instantaneous direction of movement being along a line tangential to the curvature of the cam channel 130 at the point of contact between the latter and the roller 138. In the restrained position of the right vertical side 76, then, the idler arm 98 depends generally vertically and rigidly resists vertical displacement of the right end of the inboard or second edge of the frame means 86, FIGS. 1 and 4. Similarly, the frame means orients the idler arm 100 generally parallel to idler arm 98 so that the former also rigidly resists vertical displacement of the second or inboard edge of the frame means.

The left vertical side 76 of the tailgate is, as a result of the slot 148, unsupported so that a gravitationally induced force is applied on the frame means at the left end of the outboard or first edge of the latter by the tailgate through the second bracket 122 and the second shaft 128. The frame means, being relatively rigid, resists warping so that the gravitational force urges tilting of the entire frame means and, consequently, vertical displacement of the diagonally opposite right end of the second or inboard edge of the frame means. Since idler arm 98 is rigid and oriented to resist such vertical displacement no tilting of the frame means occurs and the gravitational force is, in effect, balanced so that the tailgate remains in a level attitude in the closed position.

Conversely, when the latch assembly 156 is actuated to release the tailgate for movement from the closed to the open position and a force is applied generally on the right side of the upper marginal edge 72 to initiate such movement, a clockwise force couple, FIG. 1, is imposed on the tailgate tending to tilt the latter in its plane. The force couple experienced by the tailgate during bodily shiftable movement generates on opposite ends of the outboard or first edge of the frame means 86 oppositely directed forces oriented in the instantaneous direction of movement of the rollers 138 and 140 urging clockwise tilting of the first edge. Again, since the frame means is relatively rigid, no warping of the plane of the frame means occurs so that the oppositely directed forces also urge the inboard or second edge of the frame means out of parallel relation to the fixed transverse axis. As recited hereinbefore, the idler arms always extend parallel to the instantaneous direction of motion of the rollers 138 and 140 and, consequently, rigidly resist displacement of the ends of the second or inboard edge of the frame means in that direction. Hence, the force couple is unable to displace the frame means and is, in effect, balanced by the idler arms so that as the tailgate descends from the closed to the open position a level or predetermined attitude thereof is maintained.

It will, of course, be apparent to those skilled in the art that the direction of movement of the tailgate is immaterial to the functioning of the movement synchronizing means. Thus, when the tailgate is bodily shifted upwardly from the open to the closed position the frame means 86 functions in a manner similar to that described hereinbefore to maintain the tailgate in a level attitude. It will further be apparent that the movement synchronizing means function independently of the means by which the motivating force is applied to the tailgate. Thus, in a power tailgate arrangement, not shown, wherein electric drive means function to automatically rotate the control arm 78 in opposite directions corresponding to raising and lowering movement of the tailgate, the frame means 86 functions in a manner similar to that described hereinbefore to maintain the tailgate in a level attitude.

Having thus described the invention, what is claimed is:

1. In a vehicle body having an opening therein and including a closure and means supporting said closure on said vehicle body asymmetrically with respect to the center of gravity of said closure for bodily shiftable movement between a closed position in said opening and an open position remote from said opening, the combination comprising, rigid frame means defining a first edge and a second edge parallel to said first edge, means pivotally connecting said first edge of said rigid frame means to said closure, means pivotally supporting said rigid frame means adjacent said second edge on said vehicle body and maintaining said second edge in parallel relation to a fixed axis of said vehicle body, said closure exerting an asymmetric force on said rigid frame means adjacent said first edge thereof urging displacement of said second edge out of parallel relation to said fixed axis, said pivotal supporting means rigidly resisting said asymmetric force and thereby preventing displacement of said second edge and tilting of said closure.

2. In a vehicle body having an opening therein and including a generally rectangular closure having an upper and a lower transverse edge and further including means supporting said closure on said vehicle body asymmetrically with respect to the center of gravity of the closure for generally vertical bodily shiftable movement between a closed position in said opening and an open position remote from said opening, the combination comprising, rigid frame means defining a first transverse edge and a second transverse edge parallel to said first transverse edge, means pivotally connecting said first transverse edge of said rigid frame means to said closure adjacent said lower transverse edge of the latter, said closure upon bodily shiftable movement thereof defining a path of motion for said first transverse edge of said rigid frame means, constraint means on said vehicle body defining a path of motion about a fixed axis of said vehicle body, and means pivotally mounting said second transverse edge of said rigid frame means on said constraint means, said second transverse edge of said frame means traversing the path of motion defined by said constraint means in response to bodily shiftable movement of said closure and being maintained by said constraint means in parallel relation to said fixed axis of said vehicle body, said closure exerting an asymmetric force on said rigid frame means adjacent said first transverse edge of the latter urging displacement of said second transverse edge out of parallel relation to said fixed axis, said constraint means rigidly resisting said asymmetric force and thereby preventing displacement of said second transverse edge and tilting of said closure.

3. The combination recited in claim 2 wherein said constraint means includes first and second rigid idler arms, means mounting each of said idler arms on said vehicle body adjacent opposite sides of said access opening for pivotal movement about said fixed axis of said vehicle body, and means pivotally connecting each of said idler arms to said rigid frame means adjacent opposite ends of said second transverse edge of the latter, said fixed axis being situated on said vehicle body such that each of said idler arms is always oriented parallel to the instantaneous direction of movement of said first transverse edge of said rigid frame means thereby to resist displacement of said second transverse edge of said rigid frame means in a direction parallel to the instantaneous direction of movement of said first transverse edge of said rigid frame means.

4. The combination recited in claim 2 further including, auxiliary guide means on said vehicle body, and follower means on said closure adjacent opposite ends of said lower transverse edge thereof engaging said auxiliary guide means, said auxiliary guide means through said follower means preventing movement of said lower transverse edge of said closure in a direction generally perpendicular to the plane of the latter thereby to stabilize said closure in said perpendicular direction.

5. In a station wagon type vehicle body having a transverse rear opening therein and including a generally rectangular tailgate having an upper and a lower transverse edge and further including a control arm pivotally supported on said vehicle body and attached to said tailgate to support said tailgate on said vehicle body asymmetrically with respect to the center of gravity of said tailgate for generally vertical bodily shiftable movement between a closed position in said opening and an open position remote from said opening, the combination comprising, auxiliary guide means on said vehicle body, follower means on said tailgate adjacent opposite ends of said lower transverse edge thereof engaging said auxiliary guide means, said auxiliary guide means preventing movement of said lower transverse edge in a direction generally perpendicular to the plane of said tailgate and defining a path of motion for said lower transverse edge, a rigid frame means including first and second support members rigidly interconnected in parallel and spaced relation, said support members defining a plane having first and second transverse parallel edges, means pivotally connecting said first transverse edge of said frame means to said tailgate generally at opposite ends of said lower transverse edge of the latter, said lower transverse edge of said tailgate thereby defining a path of motion for said first transverse edge upon bodily shiftable movement of said tailgate, a first rigid idler arm, a second rigid idler arm, means supporting each of said idler arms on said vehicle body generally adjacent opposite sides of said rear opening for pivotal movement about a fixed transverse axis of said vehicle body, and means pivotally connecting each of said idler arms to said rigid frame means adjacent opposite ends of said second transverse edge of the latter, said fixed transverse axis being situated on said vehicle body such that each of said idler arms is always oriented generally parallel to the instantaneous direction of movement of said first transverse edge, said second transverse edge being constrained by said idler arms to move in an arcuate path of motion about said fixed axis in response to bodily shiftable movement of said tailgate and against displacement in a direction generally parallel to the instantaneous direction of movement of said first transverse edge, said closure exerting an asymmetric force on said rigid frame means adjacent said first transverse edge thereof urging displacement of said second transverse edge in a direction parallel to the instantaneous direction of movement of said first transverse edge, said idler arms rigidly resisting said asymmetric force and thereby preventing displacement of said second transverse edge and tilting of said tailgate.

* * * * *